United States Patent

Nohmi et al.

[11] Patent Number: 4,684,859
[45] Date of Patent: Aug. 4, 1987

[54] CHOPPER CONTROL SYSTEM

[75] Inventors: Makoto Nohmi; Shoji Miyamoto, both of Kawasaki; Tadashi Takaoka, Ibaraki; Hiroyasu Oshima, Tokyo, all of Japan

[73] Assignee: Hitachi, Ltd., Tokyo, Japan

[21] Appl. No.: 692,114

[22] Filed: Jan. 17, 1985

[30] Foreign Application Priority Data

Nov. 16, 1984 [JP] Japan ................. 59-240641

[51] Int. Cl.$^4$ ......................... H02P 13/26; H02P 5/16
[52] U.S. Cl. ............................. 318/317; 318/345 R; 318/332; 318/338; 363/124; 323/284
[58] Field of Search ............... 318/311, 312, 313, 314, 318/316, 317, 318, 320, 326, 327, 138, 139, 341, 257, 345, 439, 254, 599, 332, 338, 432, 443; 363/124; 323/284, 285, 288

[56] References Cited

U.S. PATENT DOCUMENTS

| 3,234,447 | 2/1966 | Sauber | 318/345 E X |
|---|---|---|---|
| 3,366,856 | 1/1968 | Sawano | 318/615 X |
| 3,803,472 | 4/1974 | Konrad | 318/341 |
| 3,927,357 | 12/1975 | Konrad | 318/341 X |
| 3,936,715 | 2/1976 | Nixon et al. | 318/599 X |
| 3,947,738 | 3/1976 | Oliver | 318/341 |
| 3,999,111 | 12/1976 | Bailey | 318/338 X |
| 4,021,712 | 5/1977 | Ishihara et al. | 318/139 X |
| 4,037,145 | 7/1977 | Bailey et al. | 318/345 R X |
| 4,099,111 | 7/1978 | Inaba et al. | 318/338 |
| 4,119,897 | 10/1978 | Skoog | 318/345 AB X |
| 4,129,814 | 12/1978 | Francke | 318/599 X |
| 4,152,758 | 5/1979 | Bailey et al. | 318/345 G X |
| 4,211,961 | 7/1980 | Marumoto et al. | 318/139 |
| 4,268,781 | 5/1981 | Kawada et al. | 318/332 X |
| 4,292,573 | 9/1981 | Ebert et al. | 318/138 |
| 4,303,873 | 12/1981 | Hawkins | 318/327 X |
| 4,312,031 | 1/1982 | Kudor | 363/138 X |
| 4,339,697 | 7/1982 | Franz | 318/341 |
| 4,394,724 | 7/1983 | Fry et al. | 363/124 |
| 4,449,080 | 5/1984 | Konard et al. | 318/345 R X |
| 4,455,513 | 6/1984 | Fulton et al. | 318/439 X |
| 4,468,724 | 8/1984 | Omae et al. | 318/345 X |
| 4,481,448 | 11/1984 | Bishop | 318/338 X |
| 4,498,036 | 2/1985 | Salemka | 318/615 X |

Primary Examiner—William M. Shoop, Jr.
Assistant Examiner—Shik Luen Paul Ip
Attorney, Agent, or Firm—Antonelli, Terry & Wands

[57] ABSTRACT

A novel control system for the motor or the like is disclosed which operates basically on principle that the power flowing in during the conduction of a chopper gate of a chopper device is integrated, and when the integrated value reaches a target, the gate is turned off, thereby realizing the control of an instantaneous value and high response and stability without the conventional feedback control. The target value is also reduced against the excess of the source voltage under variations in load for the regenerated power. Further, a constant-voltage control limiter is added to improve the ability to prevent a slip and race.

8 Claims, 19 Drawing Figures

F I G. 11
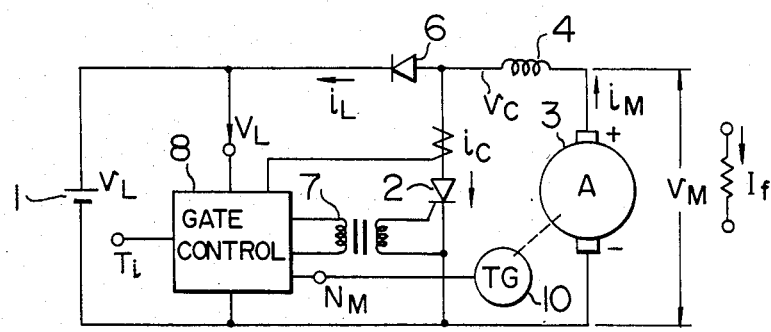
F I G. 12
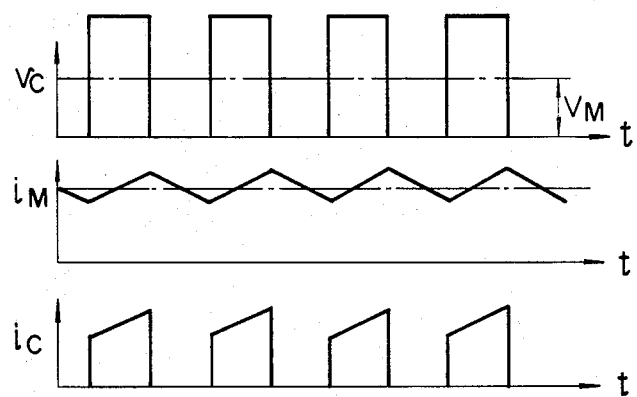
F I G. 13
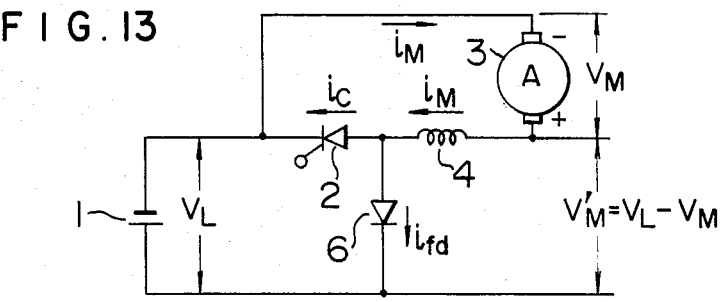

CHOPPER CONTROL SYSTEM

The present invention relates to a gate control method for a chopper control in a control system for railway vehicles and the like.

Explanation will be made specifically about the railway vehicle which is a representative application of the present invention.

The conventional chopper control systems utilize feedback control in which the motor current is fed back to a control apparatus and is controlled. Due to the nonlinearity of the system or other factors, however, it is difficult to stabilize the current which is especially easily affected by the variations in the stringing voltage, thus posing a problem.

Generally, when a vehicle in question is in a regenerative mode, the amount of power consumption by the other vehicles under the same stringing depend on the operation mode thereof, and in some cases, there may be no load on the stringing at all. It such a case, the regenerated power is not consumed, resulting in the stringing voltage increasing abruptly.

In the event that the stringing voltage increases abruptly this way, it is necessary to turn off the chopper for the reason of the breakdown voltage of the thyristor. For this purpose, the regenerated power must be controlled continuously in accordance with the load amount. In the conventional systems, since this problem is not fully obviated, the regenerating operation would be impossible due to the chopper left breaking-off.

Further, there has not yet been an effective measure of a preventing the race and slip of wheel due to the problem of response.

On the other hand, what is called VVVF(Variable Voltage Variable Frequency), that is, a drive system comprising a combination of an induction motor and an inverter which is under development has an adherence characteristic superior to that of a combination of a DC motor and a chooper. Nevertheless, this drive system presents a problem that the size of inverter unit should be large.

In view of these problems, the object of the present invention is to provide a chopper gate control system of high performance and stability, in which both the high response and stability are achieved at the same time unlike in the conventional feedback systems while improving the responsiveness to the variations in the load for regenerated power and the adherence against the race and slip of a wheel specific to the railway vehicles.

In order to achieve this object, there is provided according to the present invention a chopper control system comprising a chopper apparatus in which a power source voltage is periodically chopped to be converted thereby to drive a motor system with the converted voltage, means for calculating an integrated value of the power delivered during the conduction interval of the chopper apparatus, and means for breaking-off the chopper apparatus when the integrated value reaches a predetermined level.

The present invention will be apparent from the following detailed description taken in conjunction with the accompanying drawings, in which:

FIG. 11 is a diagram showing a general configuration of the regeneration control system according to the present invention;

FIG. 12 shows waveforms of operation of the same system;

FIG. 13 shows circuits of the chopper and the motor in regeneration mode according to the present invention;

Prior to explanation of an embodiment of the present invention, the principle and problems of a conventional system will be described below.

Figure 1:
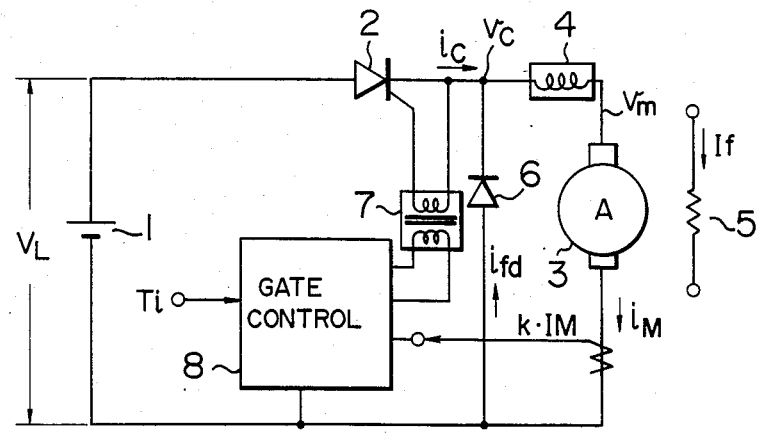
FIG. 1 is a diagram showing a general circuit of a conventional chopper system.

FIG. 1 shows a general configuration of an electric chopper, in which reference numeral 1 designates a power supply, numeral 2 a switching element, numeral 3 an armature of a motor making up a load, numeral 4 a smoothing reactance, numeral 5, a field winding of the motor, numeral 6 a flywheel diode, numeral 7 a gate pulse transformer for controlling the switching element, and numeral 8 a gate control device.

Figure 2:
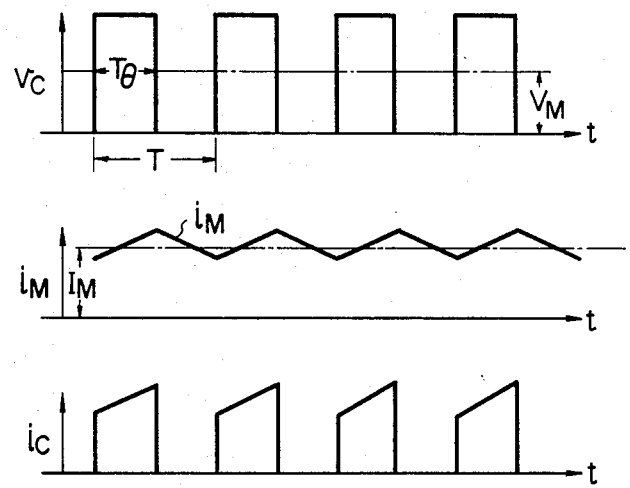
FIG. 2 shows waveforms of operation of the chopper system of FIG. 1.
Figure 3:
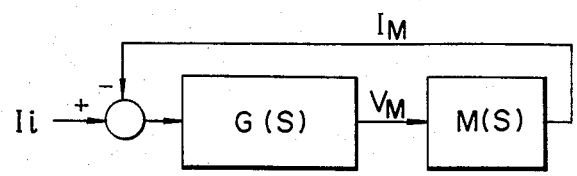
FIG. 3 is a block diagram of a conventional chopper control model.

Assume that the switching element 2 is subjected to on-off control by the gate control device 8. As shown in FIG. 2, the chopper output voltage $v_C$ has a rectangular shape as high as a source voltage $V_L$ assuming that the voltage drops across the switching element 2 and the diode 6 are negligible. The motor current $i_M$ is shaped into a continuous pulsating current by the smoothing reactor 4 and the flywheel diode 6, so that a torque proportional to this current is produced in the motor. In order to control the average value of this current to a desired level, the motor average current $I_M$ is fed back to control the conduction period $T_\theta$ of the switch.

In this method, however, a high technique is required to stabilize the system due to the delay attributable to the time constant of the filter used for averaging the motor current $i_M$ and the feedback control in which a control is performed on the basis of the past result.

A method of solving this problem is by detecting the current directly and turning on and off the gate at the predetermined upper and lower limits of the current. The problem of this method is that the current undergoes changes as it is determined by the transfer function of the whole system, often causing an inductive disturbance to the signal system of an electric vehicle.

If the gate is to be operated with the frequency fixed and the current alone measured, it is necessary to determine the time point of gate-off for attaining a predetermined value of the output current $i_M$ or $I_M$ without fail during the period from the opening of the gate to the closing thereof. The value of the average current affected by the flywheel effect of the diode 6 after gate off, however, depends on the constants of the system and the motor speed but not solely on the value of the current.

At present, therefore, the average current is generally used for the purpose of control.

In the regeneration control of the railway vehicle, the amount of the load that consumes the regenerated power is not constant. In the case where the load has not sufficient capacity to consume the regenerated power, it is necessary to detect the rising source voltage and suppress the regenerated power to prevent an overvoltage. For the problem of response, however, continuous control to a sufficiently low level of load is difficult, so that an over-voltage occurs against an excessively low load with the result that the chopper is isolated by a protection circuit.

Further, a problem unique to the railway vehicle is posed by the phenomenon that the race and slip of a wheel depend on the adherence coefficient between the rail and the wheel. This disadvantage has not yet necessarily been overcome effectively due to the problem of response.

If it is possible to forecast the value of the average current, including the current following the gate off point, until the gate is turned off, it would not be necessary to detect the average current nor to consider the delay elements of the system, thereby stabilizing and simplifying the system.

A gate-off point may be determined in the manner described below. First, according to the principle of the chopper, the energy fed from the switch 2 during the gate on is equal to the energy of input to the load during a cycle, and therefore if the energy applied to the motor through the switch 2 during the gate-on could be controlled, it would be possible to fully control the power that is the energy per unit time of the motor operation.

This energy is given as an integration of the product of the current flowing through the switch and the output voltage thereof, and the energy control could be realized by turning off the gate when the integration has reached a desired value.

The power $P_M$ of the motor is expressed as the product of the motor speed $N_M$ and torque $T_M$ as follows:

$$P_M = N_M \cdot T_M \tag{1}$$

Ignoring the loss of the motor, this power should be equal to the value of the chopper feed energy divided by the period.

If the desired torque $T_M$ is to be obtained, therefore, the gate should be controlled on the basis of an instruction torque $T_i$ multiplied by the motor speed $N_M$. It would then be possible to control the motor torque $T_M$, with the result that the motor current could be controlled. To control the motor current is only an indirect means of producing the desired torque except for protection of over current, and what is apparently required is to control the torque.

Figure 4:
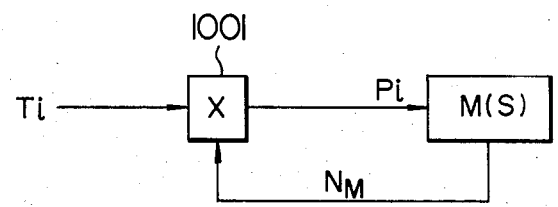
FIG. 4 is a block diagram of a control model according to the present invention.
Figure 5:
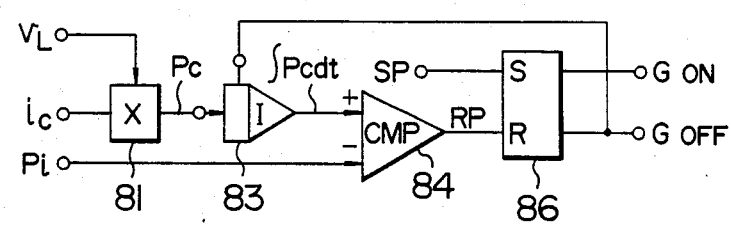
FIG. 5 shows a control circuit according to the present invention.

FIG. 4 shows a control model of a system including a motor of power control type forming the basis of the present invention. Reference character M(s) designates a transfer function of the motor, and power given by the product of the instruction torque $T_i$ and the motor speed $N_M$ is applied to the motor. FIG. 5 shows an analog circuit illustrating a method of gate control for power control necessary for configuring the system of FIG. 4.

In FIG. 5, numeral 81 designates a multiplier for producing the product of a current and a voltage, numeral 83 an integrator, numeral 84 a comparator, and numeral 86 a flip-flop for producing a gate on-off signal.

Figure 6:
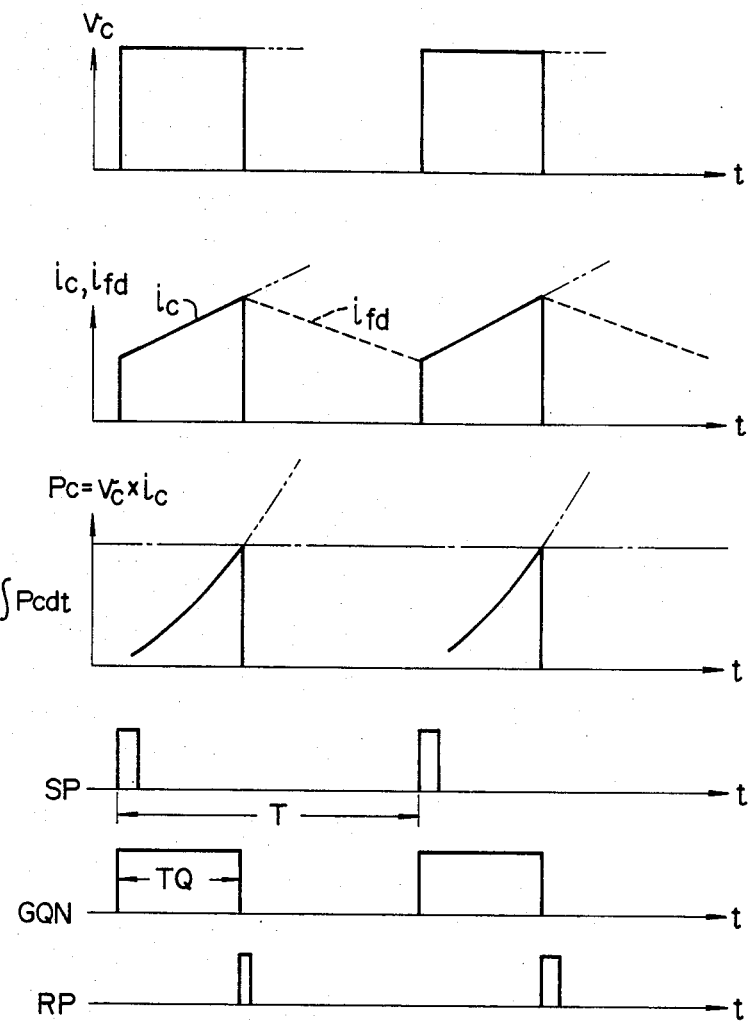
FIG. 6 shows waveforms of operation of the circuit of FIG. 5.

FIG. 6 shows the operating principle of the circuit and the operation of a chopper. In FIG. 5, in order to turn on the chopper gate, a set pulse is applied to the set input of the flip-flop 86. This way, the chopper gate is tuned on, while at the same time calculating the product of a voltage $v_L$ and a current $i_c$ at the multiplier 81. The product thus obtained is integrated at the integrator 83 to produce $\int P_c dt$. On the other hand, an instruction power $P_i$ is applied to and is compared with $\int P_c dt$ at the comparator 84, so that when $\int P_c dt$ becomes equal to $P_i$, the flip-flop 86 is reset while at the same time initializing the integration to zero. By doing so, the energy during power conduction of the chopper switch and the power instruction (Which is actually the energy during the chopper period T and is accurately the required power multiplied by the period T) can be rendered equal to each other.

Figure 7:
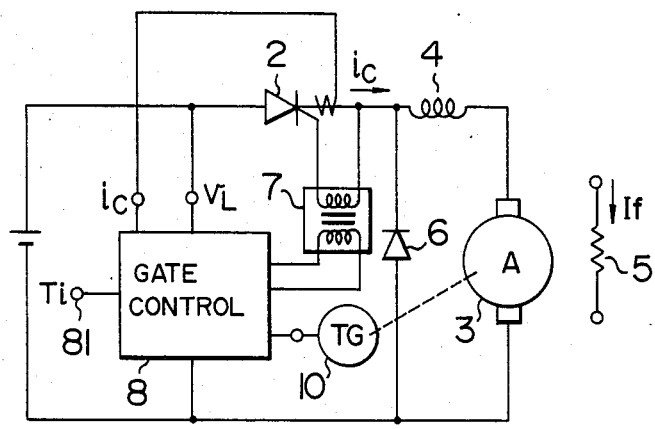
FIG. 7 is a diagram showing a general configuration of the present invention.

FIG. 7 shows a configuration of an example of the chopper using the above-mentioned method, which is different from the circuit of FIG. 1 in that the current is detected not by the motor current $i_M$ but by the chopper current $i_c$ and in that in order to convert the instruction torque $T_i$ to the power $P_i$, the gate control device is provided with a tachogenerator 10 with an input terminal thereof for detecting the motor speed and a detection terminal of the source voltage $v_L$ for detecting the chopper output power.

Figure 8:
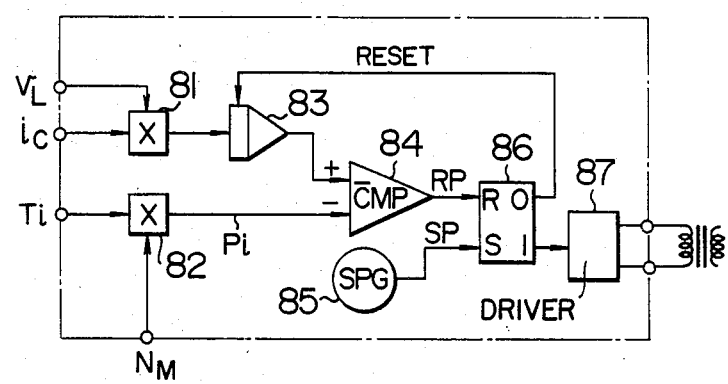
FIG. 8 is a block diagram of the control system according to the present invention.

FIG. 8 is a block diagram of the gate control device 8 in this system, which in addition to the devices included in the block diagram of FIG. 5, is provided with a gate pulse output driver 87, a multiplier 82 for calculating the product of the instruction torque $T_i$ and the speed $N_M$, and a set pulse generator 85 for giving a timing of gate-on.

Figure 9:
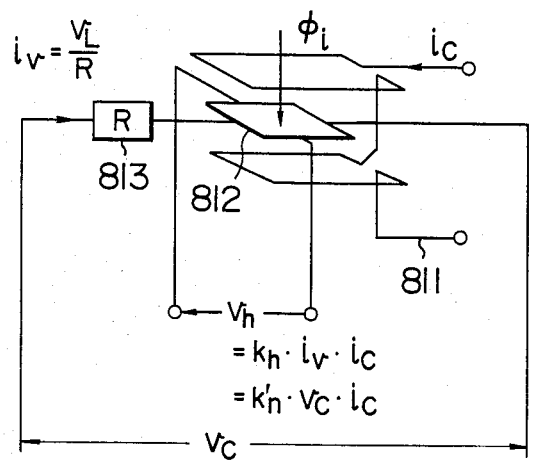
FIG. 9 is a diagram showing a power detector circuit.

The source voltage $v_L$, but not the chopper output voltage $v_c$, is detected, since the voltage drop across the switch 2 can be neglected as compared with the source voltage, and therefore the voltage may be detected at the output terminal of the switch 2. FIG. 9 shows an example using a Hall effect element as a multiplier for obtaining the product of the voltage and the current. When the chopper current $i_c$ and a current $i_v$ proportional to the voltage $v_L$ are applied to the coil and the Hall element respectively, the product of the voltage and current, that is, power is produced at the output terminal thereof. In this way, power can be detected directly with high response without any current converter for detecting the DC current (a pulsating current in this case) from a high voltage circuit with isolation.

Figure 10:
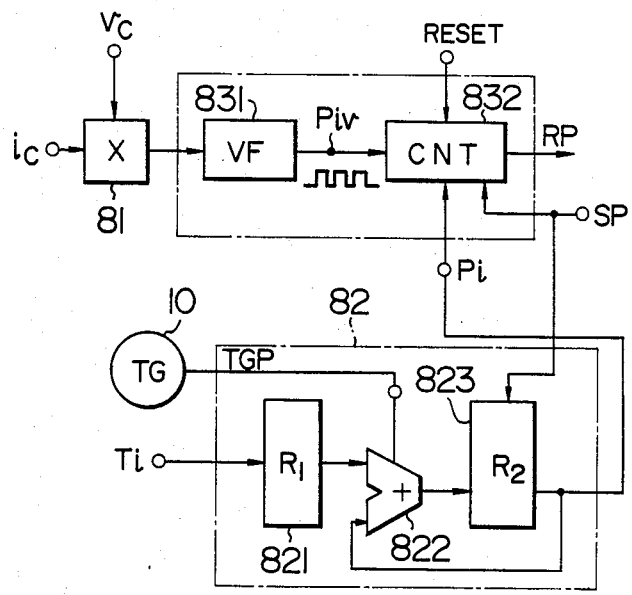
FIG. 10 is a diagram showing a digitizing circuit for the control section according to the present invention.

FIG. 10 shows a method of simplifying the digitizing process by using pulses as part of the detection signal. A power value is converted into a pulse proportional to the value by a voltage-frequency converter 831, and the integrator is replaced by a counter 832 for simplification. The digital amount $P_i$ to be compared is set at the timing of gate on, and when the digital amount is counted down to zero, a reset pulse R is produced.

Another advantage of using pulses is that instead of a special converter required for separating the high-voltage circuit and the control circuit, a signal line such as of optical fiber easy to insulate may be used.

Further, a rotary encoder or the like may be used as the tachogenerator 10, and if the output of the rotary encoder is produced as pulses of a frequency proportional to the speed, an error or a drift which would occur in the analog measurement with a DC generator is eliminated thereby to accurately measure the revolutional speed. At the same time, the integration of the product of the speed $N_M$ and the torque instruction $T_i$ can be calculated by accumulating the digital amount proportional to $T_i$ each time of arrival of the pulse, thus simplifying the calculation.

Apart from the above-mentioned case in which power supplied flows from the chopper into the motor as a powering operation, FIG. 11 shows a configuration for regeneration in which the motor is decelerated to return the energy thereto to the power supply side. This configuration is different from that for powering in that the diode 6 replaces the switch element 2, that the rectification is opposite in direction, and that the gate controller functions differently.

FIG. 12 shows voltage and current waveforms of operation of the circuit shown in FIG. 11. The current $i_c$ flowing at the time of switch on with $v_c$ zero is used to accumulate energy in the reactance 4, and the energy is returned to the power supply through the diode 6 during the switch-off period. In this configuration, the motor voltage $v_M$ is required to be lower than the source voltage $v_L$.

Such a voltage relation can be realized by selecting the field current $I_f$ properly, and it is assumed that such a condition is fulfilled in this case.

The problem of this circuit configuration is that the regeneration energy (that is, the opposite of the injection energy for powering) is generated during the chopper-off period, thereby making control impossible during the chopper-on period unlike in the case of powering.

The essential parts of the circuit shown in FIG. 11 are illustrated in different forms in FIG. 13. As compared with the case of powering, it will be clear that the directions of the power supply, switch and diode are opposite and that the negative terminal of the motor is connected not to the diode 6 but to the switch element.

Figure 14:
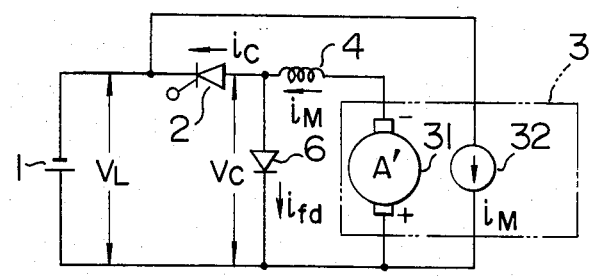
FIG. 14 is a diagram showing an equivalent circuit of FIG. 13.
Figure 15:
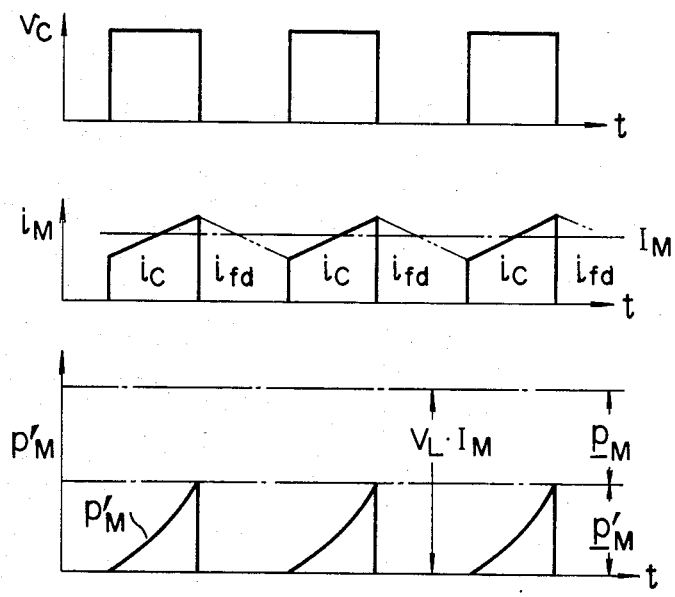
FIG. 15 shows waveforms of renegeneration control operation according to the present invention.

FIG. 14 shows an equivalent circuit of FIG. 13. In FIG. 14, the motor 3 (a generator in this case) is given by a virtual motor 31 and a virtual current source 32, and except that the current source 32 is provided and the voltage and current are opposite in direction, the circuit configuration is identical to that for powering.

By making the current of the current source 32 equal to the motor current $i_M$, an equivalent operation of the motor 3 is achieved. Since the terminals of the motor 3 are connected directly to the power supply, however, the chopper switch 2 equivalently controls the virtual motor 31.

Under this condition, the equivalent input power $P_M'$ of the virtual motor is given by the power $P_R = V_L \times I_M$ returned to the power supply side from the current source 32, less the actual regeneration power $P_M$ of the motor, and is expressed as $$P_M' = P_R - P_M = V_L \cdot I_M - P_M \tag{2}$$

In other words, if the power instruction in the form of $P_M' = V_L \cdot I_M - P_M$ is given to the virtual motor 31, a substantial rengeneration power $P_M$ is obtained.

In contrast to the power instruction $P_M$ for powering control, therefore, the instruction $V_L \cdot I_M - P_M$ is applied in the case of regeneration, thus making it possible to control the regeneration by the same concept as for the powering control.

In the above-quoted equation, character $I_M$ designates signates a current instruction value generating a necessary deceleration torque $T_i$, which is not required for powering control. The value $I_M$ may be set as proportional to the torque $T_i$ if the field current is constant, while the conversion factor must be changed in accordance with the field current in the case where the magnetic field is changed.

Figure 16:
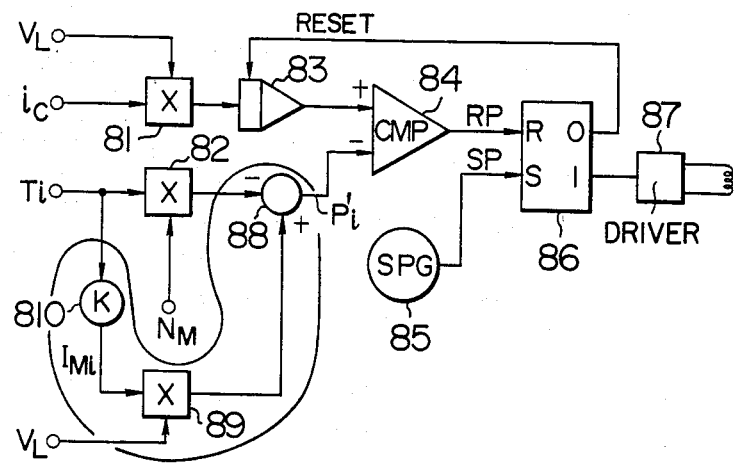
FIG. 16 is a diagram showing a regeneration control circuit.

FIG. 16 shows an analog circuit representing the above-mentioned method of regeneration control. As compared with the powering control shown in FIG. 8, a coefficient multiplier 810, a multiplier 89 and an adder 88 are additionally included for providing a power instruction $P_i'$.

If the section relating to the power instruction is switched between powering and regeneration controls, therefore, both of them are controllable by the same method.

The principle and an embodiment of the method of control according to the present invention are described above in an analog circuit. It is obvious, however, that the same effect can be realized by a corresponding digital circuit or a processing by microcomputer or the like.

In the aforementioned method, there may be a case in which the time constant of the motor or the smoothing reactor prevents the injection energy of the chopper (integrated power value) from reaching a predetermined value within a unit period so that it is impossible to determine the gate-off point in that period. In such a case, the problem is solved by changing the instruction value slowly but not abruptly or by setting a maximum conduction period for forcible gate-off operation when the maximum conduction period is reached in spite of the integrated value being not at a target value.

According to this method, since the motor current is not controlled directly, the desired current value may not be obtained due to the loss of the motor. In such a case, compensation is provided by adding the value $I_M^2 \cdot R$ derived from the motor current $I_M$ and the internal resistance R, if a resistance loss is involved as the loss of the motor, to the instruction value in advance. Further, unstable factors may be compensated for by feed back of the motor current to the control system.

Especially at the time of start from zero in speed, all the power consumption on the motor side is a resistance loss, and therefore it is necessary to add this loss to the instruction value in advance.

The basic principle of the chopper gate control system according to the present invention is described above. Now, explanation will be made about a measure for preventing an over-voltage against load variations at the time of regeneration control for improving the effectiveness of the system according to the present invention.

An over-voltage is caused by the power consumption of the load which is lower than the regeneration power at the time of regeneration.

In a most simple method of obviating this problem in the present invention, a reference voltage $V_{LM}$ is set against the increase in the source voltage, so that when the source voltage $V_L$ exceeds the reference voltage $V_{LM}$, the voltage $V_L$ in the term $V_L \cdot I_M$ on the right side of equation (2), but not the source voltage itself, is reduced thereby to control the regeneration voltage from time to time.

As an example, the method of reducing the regeneration voltage proportionately according to the overvoltage is realized by $$\left. \begin{array}{l} P_{M'} = V_L \cdot I_m - P_M, \quad V_L < V_{LM} \\ P_{M'} = \{V_L - K(V_L - V_{LM})\} \cdot I_M - P_M, \quad V_L \geqq V_{LM} \end{array} \right\} \quad (3)$$

The reduction in regeneration voltage is not necessarily required to be proportionate but the whole left side of equation (3) may be reduced without the relationship of equation (3).

Figure 18:
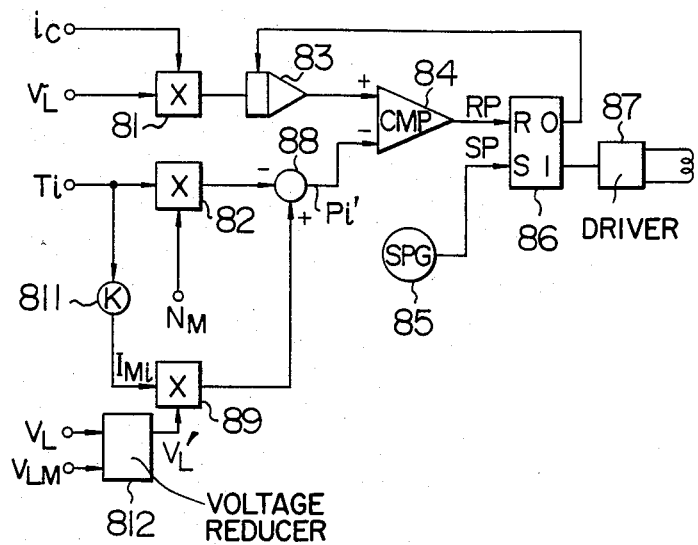
FIG. 18 is a block diagram of an over voltage prevention control system.

In the method of equation (3), however, when the value $P_M$ that is, the motor speed or torque is large, the rate of voltage rise is increased, and therefore the value of the right side of equation (3) is reduced earlier, thus producing a high effect of over-voltage suppression than by proportionate reduction in the whole right side. In FIG. 18, this function of suppressing an over-voltage is added to the control block in FIG. 16, and numeral 812 designates a device for producing a reduced voltage $V_L$, from the reference voltage $V_{LM}$ and the source voltage $V_L$. When the target $P_i'$ becomes smaller than or equal to zero, the gate may be prevented from operating, thereby completely stopping the regeneration.

Now, a method of reducing the race and slip of a wheel which presents another problem will be explained.

Generally, a race and slip of a wheel of a railway vehicle occurs when the acceleration or deceleration rate is excessively increased and the traction force or braking force exceeds the frictional force between the wheel and rail.

One method of reducing this race and slip is by providing a constant speed charactristic to the drive system so that the torque is changed in the case where the motor speed changes with reference to a specified speed.

Generally, a shunt motor has a constant speed characteristic. Nevertheless, in the railway vehicle application, a constant torque characteristic is provided by the control of the drive system, and therefore the characteristic as a shunt motor is completely lost. For the purpose of control, it is necessary to satisfy the demand of both the constant speed characteristic and the constant torque characteristic which are incompatible with each other. This is realized by the means described below.

Assume a powering control by way of simplification. In the control block diagram of FIG. 8, the motor speed $N_M$ is detected, and on the basis of the motor speed $N_M$, a control target $P_i$ is obtained. If $N_M$ is assumed to be the actual velocity $V_T$, but not the revolutional speed of the motor driven by the chopper, then $V_T$ and $N_M$ are proportional to each other in the absence of race and slip, and can be controlled fully equivalently by adjusting the coefficient. Since the target instruction value $P_i$ in the presence of a race and slip is calculated from $V_T$, on the other hand, the motor input power remains unchanged with the speed $N_M$, with the result that the torque is reduced by the amount of increase in $N_M$. However, this reduction characteristic is only inversely proportional to the speed $N_M$ and therefore is not necessarily satisfactory.

Means of further improving the torque reduction effect is provided by adding the shunt characteristic as described below.

The torque characteristic is determined by the parts of the circuit configuration for setting the target value $P_i$ and detecting the chopping power $P_C$. The circuit part for detecting $P_C$ detects and integrates the real power and achieves a constant power characteristic, thus producing a constant torque characteristic. If the function to achieve a constant-voltage characteristic is provided together with the constant-power characteristic to determine the gate-off timing with both of them, the constant-torque and constant-speed characteristics are realized at the same time.

Figure 17:
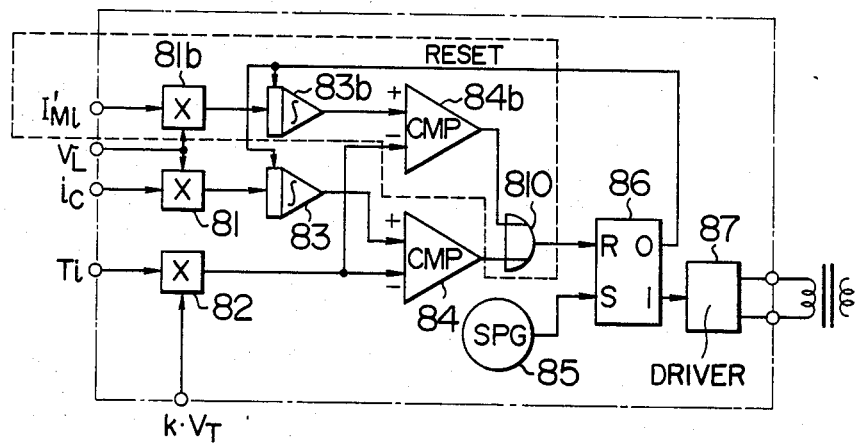
FIG. 17 is a block diagram of a control system for preventing a race and slip of wheel.

Such means is provided by the embodiment shown in FIG. 17, in which numerals 81b, 83b, 84b, 810 designate a constant-voltage control function added to the block diagram of FIG. 8, and character $V_T$ a train velocity replacing the motor speed $N_M$ in FIG. 8. For simplification, $V_T$ is assumed to be equal to $N_M$ in the absence of race and slip with the proportionality factor as unity.

If the vehicle is running under steady state with constant torque, the elements 81, 83 and 84 determine the gate-off timing to obtain a constant torque. In this state, a predetermined constant power characteristic is obtained by the element 84b without resetting the flip-flop 86 before the element 84, if the condition $I_{Mi}' < I_{Mi}$ is established. In the event of a race and slip, the motor current is reduced by the amount of the increase in the motor speed by the above-mentioned constant-power characteristic, so that the current $i_C$ is reduced. The reduction in the current $i_C$ causes the constant-power control function to increase the conduction time in an attempt to reach the target value $P_c$. When the motor current is reduced below the current value $I_{Mi}'$ set in the constant-voltage control sections 81b, 83b, and 84b, however, the target value $P_i$ is reached by $\int V_L \cdot I_{Mi}'$ dt earlier than by $\int V_L \cdot i_c$ dt, thus turning off the gate.

$I_{Mi}'$ is a constant, and therefore if the value $P_i$ is fixed, the average value of the voltage applied to the motor is constant, thus exhibiting a constant-voltage characteristic.

The specified current $I_{Mi}$ for obtaining a spectified torque $T_i$ and the current $I_{Mi}'$ for obtaining a constant-voltage characteristic may be in such a relation that $I_{Mi} = I_{Mi}'$ in principle, in which case a constant-voltage characteristic functions against even a small race and slip. Actually, however, the coefficients of the vehicle velocity and motor speed have an error caused by the variations in wheel diameter, and therefore the value $I_{Mi}$ may not be accurately specified due to the variations in motor parameter in some cases. In view of this, it is necessary to set the current $I_{Mi}'$ at a slightly low level to secure the region of a constant-torque control, that is, a constant-power control.

The system for powering control mentioned above is clearly applicable also to that for regeneration control.

Figure 19:
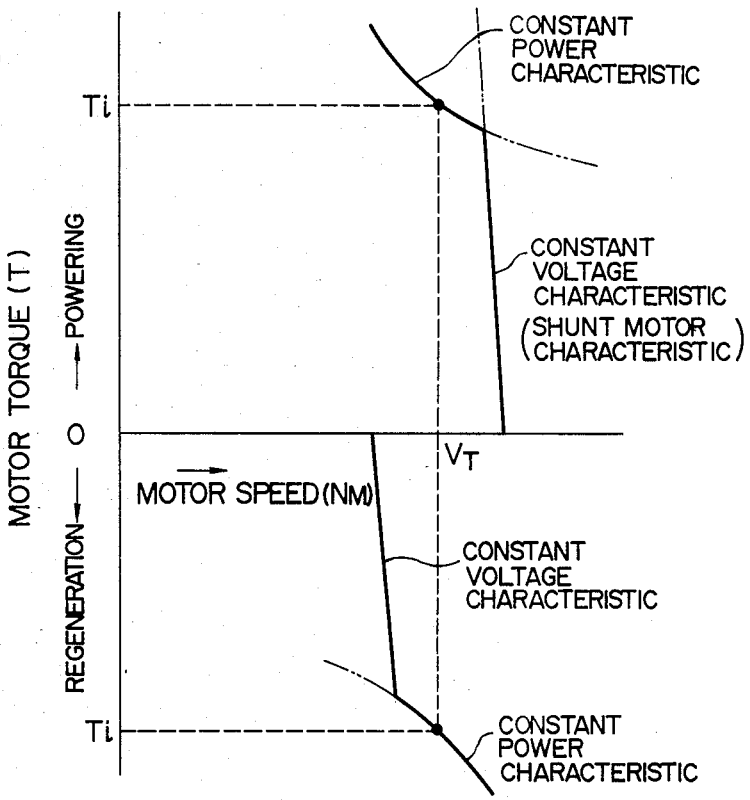
FIG. 19 is a diagram for explaining the slip characteristic of the present invention.

FIG. 19 shows torque characteristics for powering and regeneration control of the drive system that can be realized by the method described above. When $N_M = V_T$, it indicates the condition free of slip.

The vehicle speed is obtainable by a Doppler radar or by the tachometer mounted on a non-driven wheel, although another method may be used for measurement of the vehicle velocity.

Apart from the foregoing description of the embodiments which is centered on an analog circuit, the system according to the present invention is realizable with equal effect by digital processing.

Furthermore, the system according to the presnet invention may find wide applications also in various control systems other than the railway vehicles.

It will be understood from the foregoing description that according to the present invention, a high-response and high-stability chopper control system is realized while at the same time achieving a vehicle drive system very stable against load variations at the time of regeneration and the slip and race of the wheel, thereby improving the performance, energy-saving ability, safety and reliability of the vehicle. Furthermore, the high stability of the system facilitates the design thereof, so that the design and development costs are reduced to improve the economical effect thereof remarkably.

We claim:

1. A chopper control system for controlling the operation of a motor unit comprising:
   a chopper apparatus for chopping power source voltage so as to produce a chopper power required to drive said motor unit;
   means for periodically repeating calculation of an integrated value of the chopper power which varies in proportion to a chopper current applied to said motor unit through said chopper apparatus during the conduction period of the chopper apparatus; and
   means for periodically turning-on said chopper apparatus and for turning-off said chopper apparatus when said integrated value reaches a predetermined value.

2. A chopper control system according to Claim 1, further comprising means by which said predetermined value is rendered proportional to the required power of the motor unit to be driven thereby to produce a desired motor output.

3. A chopper control system according to Claim 1, further comprising means for reducing said predetermined value in accordance with the voltage increase when the source voltage increases beyond a predetermined level in the power regeneration for the motor to be driven.

4. A chopper control system according to Claim 1, further comprising means for preventing the chopper apparatus from being operated open and close when said predetermined value is reduced below zero.

5. A chopper control system according to claim 1, wherein said calculating means includes first means for integrating the product of a chopper voltage and a current value determined as a function of the required torque and second means for integrating the product of the chopper voltage and the chopper current of said chopper apparatus, and means for comparing said integrated values with said predetermined value and turning-off the chopper apparatus when one of the integrated values exceeds said predetermined value.

6. A chopper control system according to claim 1, wherein said calculating means including first means for integrating the product of a chopper voltage and a chopper current of said chopper apparatus and second means for integration the product of the chopper voltage and a current value determined as a function of the required torque of said motor unit.

7. A chopper control system for controlling the operation of vehicle motor comprising:
   chopper means for periodically chopping a power source voltage to producing a chopper power required to drive said vehicle motor;
   means for calculating an integrated value of the chopper power applied to said vehicle motor through said chopper means during the conduction period of said chopper means;
   means for calculating the required power of said vehicle motor by the product of a required torque and the vehicle speed of said vehicle motor; and
   means for turning-off said chopper means when said integrated value reaches a predetermined value provided as a function of said product.

8. A chopper control system for controlling a chopper power to be applied to an operation unit comprising:
   chopper means for intermittently passing a power source voltage for enabling production of chopper power;
   means for periodically obtaining an integrated value of the chopper power proportional to a chopper current passed through said chopper means during the conduction period thereof; and
   means for periodically turning-in said chopper means and for turning-off said chopper means when said integrated value reaches a predetermined value.

* * * * *